United States Patent
Woo et al.

(10) Patent No.: US 10,009,311 B2
(45) Date of Patent: Jun. 26, 2018

(54) CHAT-BASED SUPPORT OF MULTIPLE COMMUNICATION INTERACTION TYPES

(71) Applicants: Thomas Woo, Short Hills, NJ (US); Markus Hofmann, Fair Haven, NJ (US); James R. Ensor, Red Bank, NJ (US)

(72) Inventors: Thomas Woo, Short Hills, NJ (US); Markus Hofmann, Fair Haven, NJ (US); James R. Ensor, Red Bank, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 201 days.

(21) Appl. No.: 14/229,614

(22) Filed: Mar. 28, 2014

(65) Prior Publication Data

US 2015/0281166 A1    Oct. 1, 2015

(51) Int. Cl.
H04L 12/58 (2006.01)

(52) U.S. Cl.
CPC ............ *H04L 51/36* (2013.01); *H04L 51/02* (2013.01); *H04L 51/046* (2013.01); *H04L 51/18* (2013.01)

(58) Field of Classification Search
CPC ..................................... H04L 51/36
USPC ....................................... 709/206
See application file for complete search history.

(56) References Cited

U.S. PATENT DOCUMENTS

| | | |
|---|---|---|
| 8,000,689 B2 | 8/2011 | Featherstone |
| 2003/0227479 A1 | 12/2003 | Mizrahi |
| 2004/0078424 A1 * | 4/2004 | Yairi .................... H04L 12/581 709/203 |
| 2004/0103153 A1 | 5/2004 | Chang et al. |
| 2005/0198149 A1 * | 9/2005 | Johnson, II ............ H04L 12/58 709/206 |

(Continued)

FOREIGN PATENT DOCUMENTS

| | | |
|---|---|---|
| JP | 2002-108794 | 4/2002 |
| JP | 2003316669 A | 11/2003 |

(Continued)

OTHER PUBLICATIONS

As filed application entitled "Chat-Based Support of Communications and Related Functions," U.S. Appl. No. 14/336,069, Alcatel Lucent, filed Jul. 21, 2014, total pp. 112.

(Continued)

*Primary Examiner* — Suraj Joshi
(74) *Attorney, Agent, or Firm* — Tong, Rea, Bentley & Kim, LLC

(57) ABSTRACT

A chat-based communication capability is presented. In at least some embodiments, a chat-based communication capability utilizes a chat-based communication paradigm to support one or more communication interaction types not typically supported by chat-based communication paradigms. In at least some embodiments, a chat-based communication capability supports chat-based communication between a human entity and a non-human entity (e.g., a device, a program, a process, an organization, or the like). In at least some embodiments, a chat-based communication capability supports chat-based communication between multiple non-human entities (e.g., where the non-human entities may include devices, programs, processes, organizations, or the like).

31 Claims, 4 Drawing Sheets

(56) References Cited

U.S. PATENT DOCUMENTS

| | | |
|---|---|---|
| 2006/0059237 A1 | 3/2006 | Wilcox |
| 2007/0143662 A1 | 6/2007 | Carlson et al. |
| 2009/0013046 A1 | 1/2009 | Lee |
| 2009/0271735 A1 | 10/2009 | Anderson et al. |
| 2011/0296041 A1 | 12/2011 | Jansson |
| 2012/0239817 A1 | 9/2012 | Ensing |
| 2012/0290950 A1 | 11/2012 | Rapaport |
| 2012/0296984 A1* | 11/2012 | Khan ............... H04L 51/20 709/206 |
| 2013/0066987 A1 | 3/2013 | Levinson |
| 2013/0144961 A1 | 6/2013 | Park et al. |
| 2013/0212190 A1 | 8/2013 | Patil |
| 2014/0040404 A1 | 2/2014 | Pujare et al. |
| 2014/0324757 A1 | 10/2014 | Tabrizi |
| 2016/0036755 A1 | 2/2016 | Yamada |

FOREIGN PATENT DOCUMENTS

| | | |
|---|---|---|
| JP | 2004-533287 | 11/2004 |
| JP | 2004355634 A | 12/2004 |
| JP | 2005-107893 | 4/2005 |
| JP | 2005-182154 | 7/2005 |
| JP | 2008-048389 | 2/2008 |
| JP | 2010-003288 | 1/2010 |
| JP | 2010074660 A | 4/2010 |
| JP | 2013-522938 | 6/2013 |
| KR | 10-2012-0111859 | 10/2012 |
| WO | WO 2012/107517 A1 | 8/2012 |

OTHER PUBLICATIONS

As filed application entitled "Message Control Functions Within Communication Systems," U.S. Appl. No. 14/336,133, Alcatel Lucent, filed Jul. 21, 2014, total pp. 112.

As filed application entitled "User Interface Encapsulation in Chat-Based Communication Systems," U.S. Appl. No. 14/537,416, Alcatel Lucent, filed Nov. 10, 2014, total pp. 80.

International Search Report and Written Opinion of PCT/US2015/021414, dated Jun. 8, 2015, pp. 1-10.

Naver Blog, "How to communicate easily with Japanese people? Japanese Translator vs. Line Japanese Translator", Mar. 13, 2014, https//blog.naver.com/dorre76/120209368438, 25 pages. (with Google Translated English Text).

* cited by examiner

CHAT-BASED SUPPORT OF MULTIPLE COMMUNICATION INTERACTION TYPES

TECHNICAL FIELD

The disclosure relates generally to communication networks and, more specifically but not exclusively, to use of a chat-based communication paradigm to support various types of communication interactions.

BACKGROUND

Existing technology provides people with multiple, distinct paradigms for communicating. These communication paradigms are typically associated with specific types of communication interaction types. For example, chat-based communication paradigms may be used for human-to-human interaction, menu-based communication paradigms may be used for human-to-computer interaction, and so forth. While such communication paradigms, and associated communication interaction types, often serve their specific functions well, they also tend to place a significant demand on people using them (e.g., typically requiring their users to learn specific, often distinct, and sometimes conflicting vocabulary and syntax).

SUMMARY OF EMBODIMENTS

Various deficiencies in the prior art are addressed by embodiments for using a chat-based communication paradigm in order to support various communication interaction types.

In at least some embodiments, an apparatus includes a processor and a memory communicatively connected to the processor, where the processor is configured to execute a first chat application configured to provide a chat-based communication interface for a first entity, establish a communication channel between the first chat application and a second chat application of a second entity where the second entity is a non-human entity, and support chat-based communication between the first entity and the second entity via the communication channel.

In at least some embodiments, a method includes using a processor and a memory for executing a first chat application configured to provide a chat-based communication interface for a first entity, establishing a communication channel between the first chat application and a second chat application of a second entity where the second entity is a non-human entity, and supporting chat-based communication between the first entity and the second entity via the communication channel.

In at least some embodiments, a computer-readable storage medium stores instructions which, when executed by a computer, cause the computer to perform a method including executing a first chat application configured to provide a chat-based communication interface for a first entity, establishing a communication channel between the first chat application and a second chat application of a second entity where the second entity is a non-human entity, and supporting chat-based communication between the first entity and the second entity via the communication channel.

BRIEF DESCRIPTION OF THE DRAWINGS

The teachings herein can be readily understood by considering the detailed description in conjunction with the accompanying drawings, in which.

To facilitate understanding, identical reference numerals have been used, where possible, to designate identical elements common to the figures.

DETAILED DESCRIPTION OF EMBODIMENTS

Figure 1:
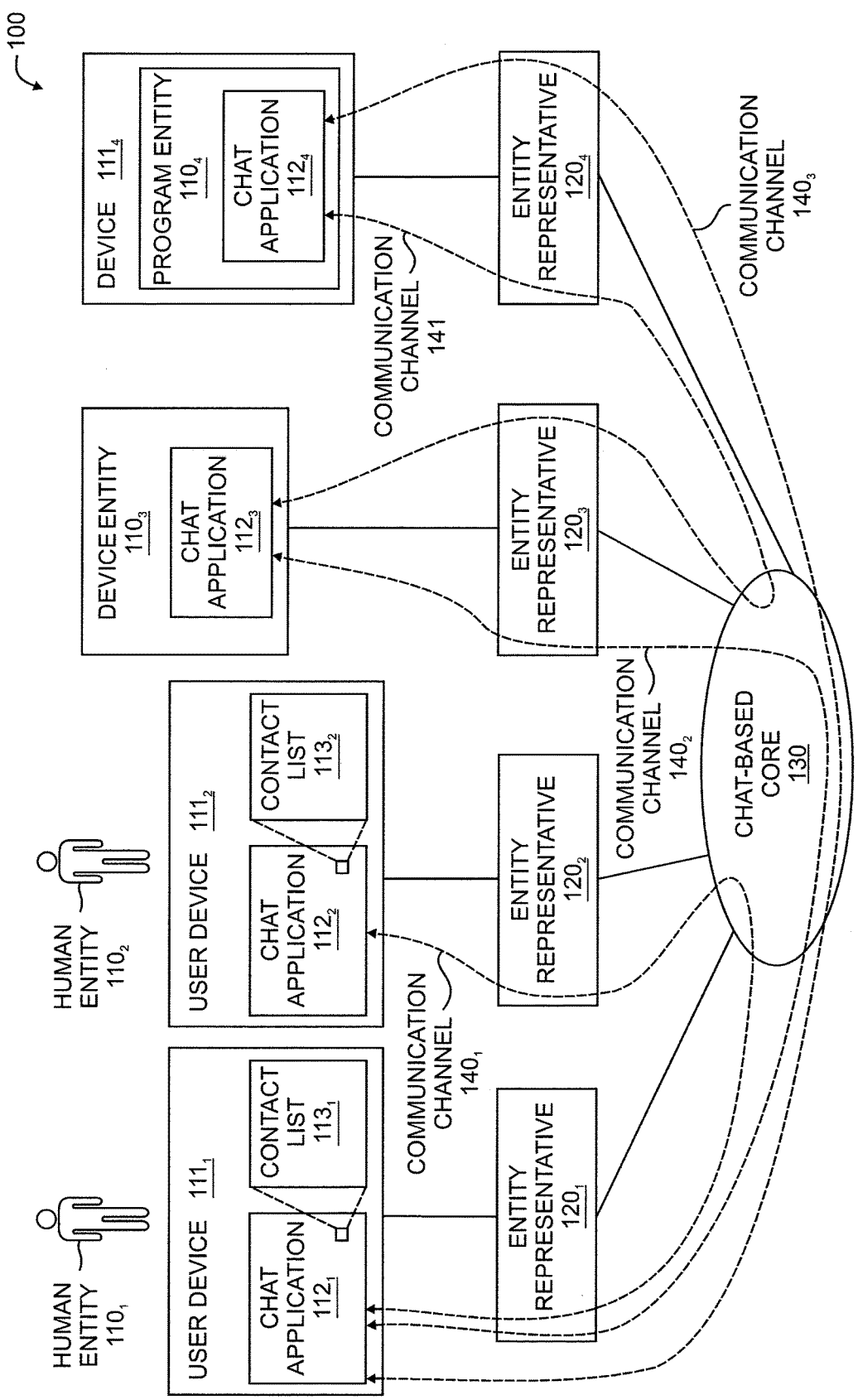
FIG. 1 depicts an exemplary chat-based system configured to support chat-based communications for multiple communication interaction types.

A chat-based communication capability is presented herein. In at least some embodiments, the chat-based communication capability utilizes a chat-based communication paradigm to support one or more communication interaction types not typically supported by chat-based communication paradigms.

In at least some embodiments, the chat-based communication capability may support chat-based communication between a human entity and a non-human entity (e.g., a device, a program running on a device, a process, an organization, or the like). In at least some embodiments, in addition to or in place of human-human communication typically supported by chat applications, a chat application may be configured to support one or more other communication interaction types for communication between a human entity and a non-human entity, such as one or more of human-device communications between a human and a device (e.g., a content server, a printer, a camera, or the like), human-program communications between a human and a program (e.g., an online e-commerce program, a restaurant order and payment processing program, a human resources program, or the like), human-process communications between a human and a process (e.g., a group conversation, a collaborative session, a digital conference, or the like), human-organization communications between a human and an organization (e.g., a business, a not-for-profit organization, an educational organization, or the like), or the like, as well as various combinations thereof.

In at least some embodiments, the chat-based communication capability may support chat-based communication between multiple non-human entities (e.g., where the non-human entities may include devices, programs, processes, organizations, or the like). In at least some embodiments, a chat application may be configured to support one or more communication interaction types for communication between multiple non-human entities, such as one or more of device-device communications between devices (which also may be referred to herein as machine-to-machine (M2M) communications), device-program communications between a device and a program, program-program communications between programs, device-process communications between a device and a process, program-process communications between a program and a process, process-process communications, and so forth.

Various embodiments of the chat-based communication capability provide a convenient and uniform way for human and non-human entities to communicate using different communication interaction types (e.g., to communicate with humans, to interact with devices, to interface with computer programs, to participate in processes, to interact with organizations, or the like) using a common chat-based communication paradigm. Various embodiments of the chat-based communication capability provide a convenient way for human and non-human entities to easily and seamlessly move between different communication interaction types. Various embodiments of the chat-based communication capability provide a comprehensive chat-based communication interface, supporting various communication interaction types, which allow human and non-human entities to participate in a wide range of communication interaction types more readily, intuitively, quickly, and simply.

These and various other embodiments and advantages of the chat-based communication capability may be better understood by way of reference to the exemplary chat-based system of FIG. 1.

FIG. 1 depicts an exemplary chat-based system configured to support chat-based communications for multiple communication interaction types.

The chat-based system 100 includes a set of entities $110_1$-$110_4$ (collectively, entities 110), a set of entity representatives $120_1$-$120_4$ (collectively, entity representatives 120) associated with respective entities $110_1$-$110_4$, and a chat-based core 130. The entities 110 include human entities (illustratively, a human entity $110_1$ and a human entity $110_2$) and non-human entities (illustratively, device entity $110_3$ and a program entity $110_4$). The chat-based system 100 is configured to support multiple communication interactions types between entities 110, which may include chat-based communications involving a human entity (primarily depicted and described herein from the perspective of the human entity $110_1$) or chat-based communications that do not involve a human entity. The chat-based communications involving a human entity may include chat-based communication between human entities (e.g., a typical chat session between human entity $110_1$ and human entity $110_2$), chat-based communication between a human entity and a non-human entity (e.g., again, primarily depicted and described herein from the perspective of human entity $110_1$), or the like. The chat-based communications that do not involve a human entity may include chat-based communications between devices, chat-based communications between a device and a program, chat-based communications between programs, or the like. The entity representatives 120 and chat-based core 130 are configured to facilitate communications between various entities 110 as discussed in additional detail below.

As discussed above, chat-based system 110 may support multiple communication interaction types for a human entity (illustratively, for human entity $110_1$). The human entity $110_1$ is using an associated user device $111_1$ supporting a chat application $112_1$. The user device $111_1$ of human entity $110_1$ may be a computer, smartphone, or any other device suitable for executing chat application $112_1$. The chat application $112_1$ is an enhanced chat application that is configured to provide more functions than a typical chat application (namely, chat application $112_1$ is configured to support multiple communication interaction types in addition to human-to-human communications). The chat application $112_1$ is executing on user device $111_1$ such that the human entity $110_1$ may utilize chat application $112_1$ to engage in various types of chat-based communication interactions (e.g., human-to-human, human-device, human-program, or the like) as discussed further below. The chat application $112_1$ provides a chat-based communication interface via which human entity $110_1$ may provide information for propagation to other entities 110 and via which human entity $110_1$ may receive information from other entities 110. The chat application $112_1$ supports establishment of communication channels between chat application $112_1$ and chat applications running on other entities 110 (described below), such that information provided by human entity $110_1$ via the chat-based communication interface of chat application $112_1$ may be propagated to other entities 110 and, similarly, such that information from other entities 110 may be propagated to chat application $112_1$ for presentation to human entity $110_1$. The chat application $112_1$ has associated therewith a contact list $113_1$, which includes a list of other entities 110 that are associated with human entity $110_1$ via chat application $112_1$ (illustratively, human entity $110_2$, device entity $110_3$, and program entity $110_4$, as discussed further below) and, thus, with which chat application $112_1$ may support communication channels for chat-based communications with other entities 110. The chat application $112_1$, including associated contact list $113_1$, may be adapted for display to human entity $110_1$ via one or more presentation interfaces of user device $111_1$ (although it will be appreciated that chat application $112_1$ also may continue to run even when not displayed). It will be appreciated that, although primarily depicted and described with respect to embodiments in which chat application $112_1$ runs exclusively on user device $111_1$ (and, similarly, associated contact list $113_1$ is stored on user device $111_1$), at least some components or functions of chat application $112_1$ may also or alternatively be running (and, similarly, at least a portion of contact list $113_1$ also or alternatively may be stored) on one or more other elements (e.g., entity representative $120_1$, chat-based core 130, one or more other elements, or the like, as well as various combinations thereof).

The chat-based system 100 supports a typical human-to-human interaction between human entity $110_1$ and human entity $110_2$. The human entity $110_2$ is using an associated user device $111_2$ supporting a chat application $112_2$. The user device $111_2$ of human entity $110_2$ may be a computer, smartphone, or any other device suitable for executing chat application $112_2$. The chat application $112_2$ may be a typical chat application that only supports a single interaction type (i.e., human-to-human communications) or may be an enhanced chat application (e.g., such as chat application $112_1$ being used by human entity $110_1$). The chat application $112_2$ supports a chat-based communication interface via which human entity $110_2$ may provide information for propagation to human entity $110_1$ and via which human entity $110_2$ may receive information from human entity $110_1$. The chat application $112_2$ has associated therewith a contact list $113_2$, which includes a list of other entities 110 that are associated with human entity $110_2$ via chat application $112_2$ (illustratively, human entity $110_1$). The chat application $112_2$, including associated contact list $113_2$, may be adapted for display to human entity $110_2$ via one or more presentation interfaces of user device $111_2$. The chat-based system 100 supports establishment of a communication channel $140_1$ between the chat application $112_1$ of user device $111_1$ and the chat application $112_2$ of user device $111_2$. The communication channel $140_1$ between the chat application $112_1$ of user device $111_1$ and the chat application $112_2$ of user device $111_2$ supports propagation of chat-based communication between human entity $110_1$ and human entity $110_2$. For example, human entity $110_1$ may use the chat-based communication interface of chat application $112_1$ to enter and submit messages intended for human entity $110_2$ (which are delivered to chat application $112_2$ of user device $111_2$ via communication channel $140_1$ and presented to human entity $110_2$ via the chat-based communication interface of chat application $112_2$ of user device $111_2$) and, similarly, human entity $110_2$ may use the chat-based communication interface of chat application $112_2$ to enter and submit messages intended for human entity $110_1$ (which are delivered to chat application $112_1$ of user device $111_1$ via communication channel $140_1$ and presented to human entity $110_1$ via the chat-based communication interface of chat application $112_1$ of user device $111_1$). In this manner, human entity $110_1$ and human entity $110_2$ may carry on a conversation in real time. The typical interaction between human entities within the context of a chat session will be understood by one skilled in the art and, thus, a description of such interaction is omitted. The communication channel $140_1$ also traverses entity representatives $120_1$ and $120_2$ and chat-based core 130, one or more of which may perform various functions in support of the chat-based communication between human entity $110_1$ and human entity $110_2$ via communication channel $140_1$.

The chat-based system 100 supports human-device interaction between human entity $110_1$ and entity $110_3$, which is a device entity. The device entity $110_3$ may be any type of device with which user device $111_1$ of human entity $110_1$ may communicate. For example, device entity $110_3$ may be a network device (e.g., a database from which human entity $110_1$ may request information, a content server from which human entity $110_1$ may request content or on which human entity $110_1$ may store content, or the like), a datacenter device (e.g., a host server hosting a virtual machine accessible to human entity $110_1$, a file system accessible to human entity $110_1$, or the like), a device available on a local area network (e.g., a computer, a storage device, a printer, a copier, a scanner, or the like), a smart device for a smart environment (e.g., a sensor, an actuator, a monitor, a camera, an appliance, or the like), an end-user device (e.g., a computer, a smartphone, a television, or the like), a vehicle-mounted communication device, a near-field communication device, or the like. The device entity $110_3$ includes a chat application $112_3$. The chat-based system 100 supports establishment of a communication channel $140_2$ between the chat application $112_1$ of user device $111_1$ and the chat application $112_3$ of device entity $110_3$. The chat application $112_3$ supports a chat-based communication interface via which device entity $110_3$ may provide information for propagation to human entity $110_1$ and via which device entity $110_3$ may receive information from human entity $110_1$. The chat-based communication interface may provide an interface between the chat application $112_3$ (including the communication channel $140_2$ established with chat application $112_3$) and one or more modules or elements of device entity $110_3$ (e.g., modules or elements configured to process information received via communication channel $140_2$, modules or elements configured to provide information for transmission via communication channel $140_2$, or the like, as well as various combinations thereof). The chat application $112_3$ may have associated therewith a contact list $113_3$, which includes a list of other entities 110 that are associated with device entity $110_3$ via chat application $112_3$ (illustratively, human entity $110_1$). The chat application $112_3$ is not expected to include a display interface or component, as the device entity $110_3$ is expected to participate in chat-based communication via communication channel $140_2$ independent of any human interaction.

The communication channel $140_2$ between the chat application $112_1$ of user device $111_1$ and the chat application $112_3$ of device entity $110_3$ supports propagation of chat-based communication between human entity $110_1$ and device entity $110_3$. The communication channel $140_2$ between the chat application $112_1$ of user device $111_1$ and the chat application $112_3$ of device entity $110_3$ may support various types of communication between human entity $110_1$ and device entity $110_3$, where the types of communication supported may depend on the device type of device entity $110_3$. For example, human entity $110_1$ may use a chat-based communication interface of chat application $112_1$ to send a request for information or content to device entity $110_3$ via communication channel $140_2$ (e.g., a request for a video file, a request for an audio file, a request for status information from a sensor, a request for status information from a vehicle information system, or the like), and device entity $110_3$ may respond to the request by using a chat-based communication interface of chat application $112_3$ to send the requested information or content to chat application $112_1$ via communication channel $140_2$ for making the information or content accessible to human entity $110_1$. For example, human entity $110_1$ may use a chat-based communication interface of chat application $112_1$ to send a control command to device entity $110_3$ via communication channel $140_2$ (e.g., a command sent to a camera to control reconfiguration of the camera, a command sent to an actuator to control the actuator, a command sent to a printer to control configuration of the printer, a command sent to a device hosting a file system to control retrieval of data from the file system, or the like), and device entity $110_3$ may respond to the control command by using a chat-based communication interface of chat application $112_3$ to send an associated command result to chat application $112_1$ via communication channel $140_2$ for informing the human entity $110_1$ of the result of execution of the command. For example, device entity $110_3$ may use a chat-based communication interface of chat application $112_3$ to send information (e.g., a sensor status of a sensor, an indicator that a threshold of a sensor has been satisfied, an actuator status of an actuator, a measurement from a monitor, a toner or paper status of a printer, an available storage status of a digital video recorder, an indication of a potential security breach of a home network, an indicator of a status or reading of a vehicle information and control system, or the like) to chat application $112_1$ via communication channel $140_2$ for providing the information to human entity $110_1$. It will be appreciated that the foregoing examples are merely a few of the various ways in which communication channel $140_2$ between the chat application $112_1$ of user device $111_1$ and the chat application $112_3$ of device entity $110_3$ may be used to support chat-based communication between human entity $110_1$ and device entity $110_3$.

The communication channel $140_2$ between the chat application $112_1$ of user device $111_1$ and the chat application $112_3$ of device entity $110_3$ may also traverse entity representatives $120_1$ and $120_3$ and chat-based core 130, one or more of which may perform various functions in support of chat-based communication between human entity $110_1$ and device entity $110_3$ via communication channel $140_2$. For example, for a communication from human entity $110_1$ to device entity $110_3$, the communication may be routed via a path including entity representative $120_1$, chat-based core 130, and entity representative $120_3$, one or more of which may process the communication to convert the communication from a format supported by human entity $110_1$ (e.g., natural language) to a format supported by device entity $110_3$ (e.g., a machine-based format which is expected to vary across different types of devices). For example, for a communication from device entity $110_3$ to human entity $110_1$, the communication may be routed via a path including entity representative $120_3$, chat-based core 130, and entity representative $120_1$, one or more of which may process the communication to convert the communication from a format supported by device entity $110_3$ (e.g., a machine-based format, which is expected to vary across different types of devices) to a format supported by human entity $110_1$ (e.g., natural language). The entity representatives $120_1$ and $120_3$ and chat-based core 130 may operate to provide these types of conversions under various conditions in support of communications exchanged between human entity $110_1$ and device entity $110_3$ via communication channel $140_2$.

For example, where device entity $110_3$ is a video server, the human-device interaction between human entity $110_3$ and the video server may proceed as follows: (1) human entity $110_1$ may select a representation of the video server via chat application $112_1$ and enter and submit, via a chat-based communication interface of chat application $112_1$, a request such as "I want the latest movie to win a best picture award?"; (2) the request is propagated toward the chat application $112_3$ of video server via communication channel $140_2$, (3) one or more of entity representative $120_1$, chat-based core 130, or entity representative $120_3$ operates on the request in order to convert the request into a device language supported by the video server (e.g., REQUEST: MOVIE, METADATA: AWARD, BEST PICTURE WINNER, LATEST) before the request is received by the video server, (4) the chat application $112_3$ of video server receives the request and passes the request to a video identification and retrieval module of the video server via a chat-based communication interface of chat application $112_3$, (5) the video identification and retrieval module of the video server identifies and retrieves the requested movie and provides the requested movie to chat application $112_3$ of the video server, via a chat-based communication interface of chat application $112_3$, for propagation toward user device $111_1$ via communication channel $140_2$ for making the movie accessible to human entity $110_1$, and (6) chat application $112_1$ of user device $111_1$ receives movie content from the video server via communication channel $140_2$ and makes the video content accessible to human entity $110_1$ (e.g., via the chat-based communication interface of chat application $112_1$ or by passing the video content to one or more other modules on user device $111_1$).

For example, where device entity $110_3$ is a sensor, the human-device interaction between human entity $110_3$ and the sensor may proceed as follows: (1) human entity $110_1$ may select a representation of the sensor via chat application $112_1$ on user device $111_1$ and enter and submit, via a chat-based communication interface of chat application $112_1$, a query such as "what is the latest reading?", (2) the query is propagated toward the chat application $112_3$ of sensor via communication channel $140_2$, (3) one or more of entity representative $120_1$, chat-based core 130, or entity representative $120_3$ on the communication channel $140_2$ operates on the query in order to convert the query into a formatted query using device language supported by the sensor (e.g., REQUEST: DEVICE READING, LATEST) before providing the query to the sensor, (4) the chat application $112_3$ of sensor receives the formatted query and passes the formatted query to a sensor reading module of the sensor via a chat-based communication interface of chat application $112_3$, (5) the sensor reading module of the sensor identifies and obtains the requested sensor reading and provides a formatted sensor reading response to chat application $112_3$ of the sensor, via a chat-based communication interface of chat application $112_3$, for propagation toward user device $111_1$ via communication channel $140_2$ for making the requested sensor reading accessible to human entity $110_1$, (6) one or more of entity representative $120_3$, chat-based core 130, or entity representative $120_1$ operates on the formatted sensor reading response in order to convert the formatted sensor reading response into a natural language sensor reading response before providing the sensor reading to human entity $110_1$, and (7) chat application $112_1$ of user device $111_1$ receives the natural language sensor reading response via communication channel $140_2$ and presents the natural language sensor response to human entity $110_1$ via the chat-based communication interface of the chat application $112_1$.

For example, where device entity $110_3$ is a printer, the human-device interaction between human entity $110_3$ and the printer may proceed as follows: (1) human entity $110_1$ may select a representation of the printer via chat application $112_1$ on user device $111_1$ and enter and submit, via a chat-based communication interface of chat application $112_1$, a request such as "please print document1" while also attaching a copy of document1, (2) the request is propagated toward the chat application $112_3$ of printer via communication channel $140_2$, (3) one or both of chat-based core 130 and entity representative $120_3$ operates on the request in order to convert the request into a formatted request using device language supported by the printer before providing the request to the printer, (4) the chat application $112_3$ of printer receives the formatted request and associated document and passes the formatted request and associated document to a print control module of the printer via a chat-based communication interface of chat application $112_3$, (5) the print control module of the printer initiates printing of the document and, when printing is complete, provides a formatted print status response to chat application $112_3$ of the printer, via a chat-based communication interface of chat application $112_3$, for propagation toward user device $111_1$ via communication channel $140_2$ for making the print status accessible to human entity $110_1$, (6) one or both of entity representative $120_3$ or chat-based core 130 operates on the formatted print status response in order to convert the formatted print status response into a natural language print status response before providing the print status to human entity $110_1$, and (7) chat application $112_1$ of user device $111_1$ receives the natural language print status response and presents the natural language print status response to human entity $110_1$ via the chat-based communication interface of the chat application $112_1$.

It will be appreciated that the foregoing examples represent merely a few of the various ways in which chat-based system 100 may support human-device interactions between human entity $110_1$ and device entity $110_3$ via the communication channel $140_2$ between chat application $112_1$ and chat application $112_3$.

The chat-based system 100 supports human-program interaction between human entity $110_1$ and entity $110_4$, which is a program entity. The program entity $110_4$ may be any type of program on any type of device with which user device $111_1$ of human entity $110_1$ may communicate. For example, program entity $110_4$ may be an online ordering program (e.g., an e-commerce shopping program, an order and payment processing program of a restaurant, or the like), an online service provider program (e.g., a program of a telecommunications service provider, a program of an electricity provider, or the like), a program available on a network device or datacenter device (e.g., an application hosted in the network or datacenter), an ordering program of a business, a concierge program of a hotel, a taxi scheduling program of a taxi company, a vehicle information and control program of a vehicle, or the like. The program entity $110_4$ includes a chat application $112_4$. The chat-based system 100 supports establishment of a communication channel $140_4$ between the chat application $112_4$ of user device $111_1$ and the chat application $112_4$ of program entity $110_4$ running on device $111_4$). The chat application $112_4$ supports a chat-based communication interface via which program entity $110_4$ may provide information for propagation to human entity $110_1$ and via which program entity $110_4$ may receive information from human entity $110_1$. The chat-based communication interface may provide an interface between the chat application $112_4$ (including the communication channel $140_4$ established with chat application $112_3$) and one or more modules or elements of program entity $110_4$ (e.g., modules or elements configured to process information received via communication channel $140_3$, modules or elements configured to provide information for transmission via communication channel $140_3$, or the like, as well as various combinations thereof). The chat application $112_4$ may have associated therewith a contact list $113_4$, which includes a list of other entities 110 that are associated with program entity $110_4$ via chat application $112_4$ (illustratively, human entity $110_1$). The chat application $112_4$ is not expected to include a display interface or component, as the program entity $110_4$ is expected to participate in chat-based communication via communication channel $140_3$ independent of any human interaction. The communication channel $140_3$ between the chat application $112_1$ of user device $111_1$ and the chat application $112_4$ of program entity $110_4$ may support various types of communication between human entity $110_1$ and program entity $110_4$, where the types of communication supported may depend on the program type of program entity $110_4$. The communication channel $140_3$ between the chat application $112_1$ of user device $111_1$ and the chat application $112_4$ of program entity $110_4$ may also traverse entity representatives $120_1$ and $120_4$ and chat-based core 130, one or more of which may perform various functions in support of communication between human entity $110_1$ and program entity $110_4$ via communication channel $140_4$. The human-program interaction between human entity $110_1$ and program entity $110_4$ via communication channel $140_4$ is expected to be similar to the human-device interaction human entity $110_1$ and device entity $110_3$ via communication channel $140_3$ and, thus, detailed examples are omitted. For example, human entity $110_1$ may use a chat-based communication interface of chat application $112_1$ to request and receive reservations from a restaurant reservation scheduling program, a dentist office patient scheduling program may use a chat-based communication interface of chat application $112_4$ to request and receive confirmation that human entity $110_1$ intends on keeping his or her scheduled appointment, and so forth. It will be appreciated that such programs will be executing on devices (e.g., servers, physical resources hosting VMs, computers, or the like) and, thus, that various embodiments discussed herein with respect to human-device interaction between human entity $110_1$ and device entity $110_3$ also may be used for human-program interaction between human entity $110_1$ and program entity $110_4$. Namely, in at least some embodiments, human-program interaction between human entity $110_1$ and program entity $110_4$ also may be considered to be human-device interaction between human entity $110_1$ and a device hosting the program entity $110_4$.

The chat-based system 100 also may be configured to support other communication interaction types between human entity $110_1$ and other types of non-human entities. For example, chat-based system 100 also may be configured to support human-process interaction between human entity $110_1$ and one or more processes (e.g., a digital conference, a collaborative session, or the like). For example, chat-based system 100 also may be configured to support human-organization interaction between human entity $110_1$ and one or more organizations (e.g., a business, a not-for-profit organization, an educational organization, or the like). The chat-based system 100 also may be configured to support other communication interaction types between human entity $110_1$ and other types of non-human entities. For example, other types of non-human entities may include locations (e.g., a store, a restaurant, a library, or the like), objects, or the like. It will be appreciated that interaction by human entity $110_1$ with such non-human entities may be performed using devices associated with the non-human entities, as communication between human entity $110_1$ and such non-human entities will be performed using communication channels established between the chat application $112_1$ running on user device $111_1$ of human entity $110_1$ and chat applications running on devices associated with the non-human entities or chat applications integrated or associated with programs on devices associated with the non-human entities, respectively. Accordingly, various embodiments discussed herein with respect to human-device interaction between human entity $110_1$ and device entity $110_3$ and human-program interaction between human entity $110_1$ and program entity $110_4$ also may be used for other communication interaction types between human entity $110_1$ and other types of non-human entities. Namely, in at least some embodiments, other communication interaction types between human entity $110_1$ and other types of non-human entities also may be considered to be human-device interaction between human entity $110_1$ and a device that is associated with the non-human entity or human-program interaction between human entity $110_1$ and a program that is associated with the non-human entity.

The chat-based system 100 supports identification of entities 110 to chat-based core 130 such that the entities 110 are available for association with other entities 110 of chat-based system 100. For example, human entities 110 (illustratively, human entities $110_1$ and $110_2$, as well as various other human entities) may register with chat-based core 130 (e.g., by establishing an account with chat-based core 130). Similarly, for example, non-human entities 110 (illustratively, device entity $110_3$ and program entity $110_4$, as well as various other non-human entities) may register with chat-based core 130 or may be registered with chat-based core 130 (e.g., such as where a non-human entity is registered with chat-based core 130 by a human but may then participate in chat-based communications independent of human interaction). In this manner, various entities 110 become discoverable within chat-based system 100 and, thus, associations supporting various communication interactions types may be established between entities 110 as discussed herein.

The chat-based system 100, as discussed above, supports association of entities 110 with human entity $110_1$ via chat application $112_1$ and, similarly, supports establishment of communication channels 140 between chat application $112_1$ of user device $111_1$ of human entity $110_1$ and chat applications of devices or programs associated with entities 110 that are associated with human entity $110_1$ via chat application $112_1$. As discussed above, entities 110 that are associated with human entity $110_1$ via chat application $112_1$ may be associated with human entity $110_1$ via a contact list $113_1$ of chat application $112_1$ for human entity $110_1$ (and, similarly, via corresponding contact lists of chat applications of the entities) The association of entities 110 with human entity $110_1$ or disassociation of entities 110 from human entity $110_1$ (e.g., via addition to or removal of entities 110 from the contact list $113_1$ of the chat application $112_1$) may be performed manually by human entity $110_1$ via chat application $112_1$ or automatically by chat-based system 100 based on context information. The establishment of communication channels 140 between chat application $112_1$ of user device $111_1$ of human entity $110_1$ and chat applications of devices or programs associated with entities 110 may be performed, when chat application $112_1$ is invoked on user device $111_1$, for any entities 110 already associated with human entity $110_1$ (e.g., based on entities already included in the contact list $113_1$ of the chat application $112_1$). For example, chat-based core 130 may be configured to maintain the contact list $113_1$ of chat application $112_1$ and, based on detection that chat application $112_1$ has been invoked on user device $111_1$, to provide the contact list $113_1$ to chat application $112_1$ for use by chat application $112_1$ in establishing communication channels 140 between chat application $112_1$ of user device $111_1$ of human entity $110_1$ and entities 110 on the contact list $113_1$ of chat application $112_1$. The establishment or termination of communication channels 140 between chat application $112_1$ of user device $111_1$ of human entity $110_1$ and chat applications of devices or programs associated with entities 110 also may be performed at any time that chat application $112_1$ is running on user device $111_1$ (e.g., as non-human entities 110 are dynamically added to and removed from contact list $113_1$ of the chat application $112_1$ for human entity $110_1$ based on context). For example, chat-based core 130 may be configured to detect association of a new entity 110 with human entity $110_1$ or disassociation of an existing entity 110 from human entity $110_1$, update the contact list $113_1$ of chat application $112_1$ to add the new entity 110 or remove the existing entity 110, and initiate establishment of a new communication channel 140 for the new entity 110 or termination of the existing communication channel 140 of the existing entity 110.

The chat-based system 100 may be configured to support manual or automated identification of entities 110 available for association with human entity $110_1$ and, similarly, may support manual or automated association of identified entities 110 with human entity $110_1$ (e.g., via inclusion in contact list $113_1$ of chat application $112_1$).

The chat-based system 100 may support a search-based entity association capability in which the human entity $110_1$ may enter and submit specific search criteria to be used by chat-based core 130 in searching for other entities 110. For example, human entity $110_1$ may specify that he or she is searching for printers available at a particular location, restaurants available in a particular geographic area, a human resources program of a company for which he or she works, a banking program of a bank with which he or she maintains an account, a collaborative session related to a particular area of interest, or the like. The chat-based core 130 may use the search criteria to identify a set of potential entities 110 which satisfy the search criteria. The chat-based core 130 may then either (1) propagate search results, including indications of the potential entities 110, toward user device $111_1$ for presenting the potential entities 110 to the human entity $110_1$ and providing the human entity $110_1$ an opportunity to explicitly accept (or not) association of one or more of potential entities 110 with the human entity $110_1$ or (2) initiate automatic association of the potential entities 110 with the human entity $110_1$ (e.g., via addition of the potential entities 110 to the contact list $113_1$ of the chat application $112_1$ of human entity $110_1$). The manual or automatic association of a potential entity 110 with human entity $110_1$ may trigger establishment of a communication channel 140 between chat application $112_1$ of user device $111_1$ of human entity $110_1$ and a chat application of the associated entity 110.

The chat-based system 100 may support a context-based entity association capability in which chat-based core 130 obtains context information and determines whether to modify the entities 110 with which human entity $110_1$ is associated (e.g., associating with one or more entities 110 with which human entity $110_1$ is not currently associated, disassociating from one or more entities 110 with which human entity $110_1$ is currently associated, or a combination thereof). The context information may include context information associated with human entity $110_1$, context information associated with a potential or existing entity 110, or the like, as well as various combinations thereof. The context information associated with human entity $110_1$ may represent a context of human entity $110_1$, a context of user device $111_1$, a context of chat application $112_1$, any other context which may be associated with human entity $110_1$, or the like, as well as various combinations thereof. The context information associated with human entity $110_1$ may be a location of the human entity $110_1$ or user device $111_1$ (e.g., a geographic location, an indoor location, or the like), information communicated via one or more communication channels 140 supported by chat application $112_1$ of user device $111_1$ for human entity $110_1$, an indication of a need or desire of human entity $110_1$, or the like, as well as various combinations thereof. The context information associated with a potential or existing entity 110 may represent a context of the potential or existing entity 110, a context of a device associated with the potential or existing entity 110, or the like, as well as various combinations thereof. The context information associated with a potential entity 110 (e.g., being considered for being associated with human entity $110_1$) may be a location of the potential entity 110 (e.g., a geographic location, an indoor location, or the like), a capability of the potential entity 110 (e.g., a zoom capability of a camera, a print capability of a printer, or the like), or the like, as well as various combinations thereof. The context information associated with an existing entity 110 (e.g., being considered for being disassociated from human entity $110_1$) may be a location of the existing entity (e.g., a geographic location, an indoor location, or the like), a problem associated with the existing entity, or the like, as well as various combinations thereof. The context information may be provided to chat-based core 130, obtained by chat-based core 130 based on monitoring of communications exchanged via one or more communication channels 140 supported by chat application $112_1$ of user device $111_1$ and traversing chat-based core 130, provided to chat-based core 130 or otherwise obtained by chat-based core 130 from one or more other devices, or the like, as well as various combinations thereof. The management of entities 110 associated with human entity $110_1$ may include identifying a set of potential entities 110 based on the context information and either (1) propagating indications of the potential entities 110 (for association with or disassociation from human entity $110_1$) toward user device $111_1$ for presenting the potential entities 110 to the human entity $110_1$ and providing the human entity $110_1$ an opportunity to explicitly accept (or not) association of one or more of potential entities 110 with the human entity $110_1$ or disassociation of one or more of potential entities 110 from the human entity $110_1$ or (2) initiating automatic association/disassociation of the potential entities 110 with/from the human entity $110_1$ (e.g., via addition of the potential entities 110 to the contact list $113_1$ of the chat application $112_1$ of human entity $110_1$ in the case of association or removal of the potential entities 110 from the contact list $113_1$ of the chat application $112_1$ in the case of disassociation). For example, upon detecting that the user device $111_1$ of human entity $110_1$ has entered a particular geographic area, chat-based core 130 may identify a list of potential entities 110 at or near the geographic area of the user device $111_1$ (e.g., a concierge entity at a hotel, a receptionist entity at a dentist office, a printer entity at an office location, or the like). For example, upon detecting particular content in chat-based communication between human entity $110_1$ and human entity $110_2$, chat-based core 130 may identify, on the basis of the content, a list of potential entities 110 that may be of interest to human entity $110_1$ (e.g., upon detecting the word "print" or some variation thereof in a chat session, chat-based core 130 may infer that human entity $110_1$ has a need to print a document and, thus, may identify a list of printer entities which may be useful to human entity $110_1$). The manual or automatic association of a potential entity 110 with human entity $110_1$ may trigger establishment of a communication channel 140 between chat application $112_1$ of user device $111_1$ of human entity $110_1$ and the associated entity 110. As discussed above, it will be appreciated that, although primarily described with respect to use of context information for associating a potential entity 110 with human entity $110_1$ and triggering establishment of a communication channel 140 between chat application $112_1$ of user device $111_1$ of human entity $110_1$ and the chat application of the associated entity 110, context information also may be used for disassociating an associated entity 110 from human entity $110_1$ (e.g., via removal of the associated entity 110 from contact list 113) and triggering termination of the existing communication channel 140 between the chat application $112_1$ of user device $111_1$ of human entity $110_1$ and the chat application of the existing entity 110. Accordingly, chat-based system 100 may support a dynamic contact list capability whereby associations of human entity $110_1$ with other entities 110 may be updated dynamically (including addition and removal) based on context information associated with human entity $110_1$ and, similarly, communication channels 140 between chat application $112_1$ of user device $111_1$ of human entity $110_1$ and chat applications of other entities 110 may be controlled dynamically (including establishment and termination). Various embodiments of the dynamic contact list capability may be better understood by way of the following exemplary embodiments and examples.

In at least some embodiments, chat-based system 100 may be configured to, in response to one or more stimuli specified within chat-based system 100, generate a contact list identity (representing an entity 110) in the contact list $113_1$ of human entity $110_1$, as well as to create an associated communication channel 140 which may be used for communication between human entity $110_1$ and entity 110 represented by the generated contact list identity. The stimuli may include device or program state, receipt of a message (e.g., a notification, an event, or the like), or the like, as well as various combinations thereof. The chat-based system 100 (or remote processing capabilities associated with the chat-based system 100) may then support, or even enhance, interaction by human entity $110_1$ with the entity 110 that is represented by the generated contact list identity (e.g., facilitating communication between the human entity $110_1$ and the entity 110, acting upon messages or information sent from human entity $110_1$ to the entity 110, acting upon messages or information sent from entity 110 to human entity $110_1$, or the like, as well as various combinations thereof).

In at least some embodiments, for example, dynamic contact list identities may be generated in the contact list $113_1$ of human entity $110_1$ according to the location of human entity $110_1$. For example, a contact list identity named "receptionist" (e.g., a device or program that is configured to provide "receptionist" functions) might appear on contact list $113_1$ of human entity $110_1$ when human entity $110_1$ enters the reception area of a building, such that the chat-based communication interface of chat application $112_1$ may be used by human entity $110_1$ to send to the "receptionist" entity a request for directions to a particular location in the building, and the chat-based communication interface of the chat application of the "receptionist" entity may be used by the "receptionist" entity to send the requested directions to human entity $110_1$ (where the information is exchanged via the communication channel 140 established between the chat application $112_1$ and the chat application of the "receptionist" entity). For example, a contact list identity named "concierge" (e.g., a device or program that is configured to provide "concierge" functions) might appear on contact list $113_1$ of human entity $110_1$ when human entity $110_1$ enters a hotel lobby area, such that the chat-based communication interface of chat application $112_1$ may be used by human entity $110_1$ to send to the "concierge" entity a request for a reservation at a local Italian restaurant, and the chat-based communication interface of the chat application of the "concierge" entity may be used by the "concierge" entity to send to the human entity $110_1$ directions to the Italian restaurant at which the "concierge" entity made reservations on behalf of the human entity $110_1$ (where the information is exchanged via the communication channel 140 established between the chat application $112_1$ and the chat application of the "concierge" entity). For example, a contact list identity named "printer" might appear on contact list $113_1$ of human entity $110_1$ when human entity $110_1$ enters his or her work location, such that the chat-based communication interface of chat application $112_1$ may be used by human entity $110_1$ to send to the "printer" entity document and a request for the document to be printed, and the chat-based communication interface of the chat application of the "printer" entity may be used by the "printer" entity to send to the human entity $110_1$ directions to the location of the printer at which the document was printed for the human entity $110_1$ (where the information is exchanged via the communication channel 140 established between the chat application $112_1$ and the chat application of the "printer" entity). For example, a contact list identity named "cafeteria" might appear on contact list $113_1$ of human entity $110_1$ when human entity $110_1$ enters a designated location, such that (1) the chat-based communication interface of chat application $112_1$ may be used by human entity $110_1$ to send a request for a menu, (2) the chat-based communication interface of the chat application of the "cafeteria" entity may be used by the "cafeteria" entity to provide the requested menu to the human entity $110_1$, (3) the chat-based communication interface of chat application $112_1$ may be used by human entity $110_1$ to send an order for food listed on the menu, (4) the chat-based communication interface of the chat application of the "cafeteria" entity may be used by the "cafeteria" entity to request payment for the food ordered by human entity $110_1$, (5) the chat-based communication interface of chat application $112_1$ may be used by human entity $110_1$ to provide payment for the food ordered by human entity $110_1$, and (6) the chat-based communication interface of the chat application of the "cafeteria" entity may be used by the "cafeteria" entity to direct the human entity $110_1$ to a location where the food may be picked up (where the information is exchanged via the communication channel $140$ established between the chat application $112_1$ and the chat application of the "cafeteria" entity).

In at least some embodiments, for example, dynamic contact list identities may be generated in the contact list $113_1$ of human entity $110_1$ according to association of human entity $110_1$ with a process. For example, a contact list identity named "voice conference" might appear on contact list $113_1$ of human entity $110_1$ when human entity $110_1$ joins the voice conference, such that a communication channel $140$ established between the chat application $112_1$ and the chat application of the "voice conference" entity (e.g., a device or program that is associated with the voice conference) may be used by the human entity $110_1$ and the "voice conference" entity to perform various functions within the context of the voice conference (e.g., to request and control sending of an invite for an additional party to join the voice conference, to request a copy of the slides being discussed and have the requested slides be retrieved from a server and delivered to the chat application $112_1$ for presentation to human entity $110_1$, or the like). For example, a set of contact list identities associated with functions supporting a multi-party remote collaboration session (e.g., "attendance", "minutes", "slides", "video" or the like, which, for example, might be organized under a higher-level entity called "collaborative support") might appear on contact list $113_1$ of human entity $110_1$ when human entity $110_1$ joins the multi-party remote collaboration session, such that communication channels $140$ established between the chat application $112_1$ and chat applications of the "collaborative support" entities (e.g., devices or programs associated with the multi-party remote collaboration session) may be used by the human entity $110_1$ and the "collaborative support" entities to perform various functions within the context of the multi-party remote collaboration session (e.g., to request a copy of the slides being discussed and have the requested slides be retrieved from a server and delivered to the chat application $112_1$ for presentation to human entity $110_1$, to request a video feed of a physical location where parties to the multi-party remote collaboration session are located and have the video feed delivered to the chat application $112_1$ for presentation to human entity $110_1$, or the like).

In at least some embodiments, chat-based system $100$ may be configured to, in response to one or more stimuli specified within chat-based system $100$, remove an existing contact list identity (representing an entity $110$ with which human entity $110_1$ is associated) from the contact list $113_1$ of human entity $110_1$, as well as to terminate an existing communication channel $140$ previously established for communication between human entity $110_1$ and the entity $110$ represented by the existing contact list identity. The stimuli may include device or program state, receipt of a message (e.g., a notification, an event, or the like), or the like, as well as various combinations thereof. This embodiment may be better understood by further considering the examples discussed above in conjunction with dynamic generation of contact list identities. For example, the "receptionist" entity may be removed from the contact list $113_1$ based on a determination that the human entity $110_1$ has left the building, the "concierge" entity may be removed from the contact list $113_1$ based on a determination that the human entity $110_1$ has left the lobby area of the hotel, the "printer" entity may be removed from the contact list $113_1$ based on a determination that the human entity $110_1$ has left the building, the "cafeteria" entity may be removed from the contact list $113_1$ based on a determination that the human entity $110_1$ has left the building, the "voice conference" entity may be removed from the contact list $113_1$ based on a determination that the human entity $110_1$ has left the voice conference, the "collaborative support" entities may be removed from the contact list $113_1$ based on a determination that the human entity $110_1$ has left the multi-party remote collaboration session, and so forth.

In at least some embodiments, chat-based system $100$ may be configured to support associations between contacts of an entity $110$ (e.g., between contacts included in the contact list $113_1$ of chat application $112_1$ of human entity $110_1$). The associations between contacts of human entity $110_1$ may be established or removed one or more of manually responsive to input from human entity $110_1$, automatically by chat-based core $130$ or entity representatives $120$ (e.g., based on knowledge or inference of relationships or interfaces, or knowledge or inference of lack of relationships or interfaces, between the contacts), or the like, as well as various combinations thereof. For example, a "home" contact may be associated with, and configured to act as an interface to, a collection of more specialized contacts (e.g., a "computer" contact, an "entertainment system" contact, a "smart device" contact, or the like). For example, a "work" contact may be associated with, and configured to act as an interface to, a collection of more specialized contacts (e.g., a "printer" contact, a "copier" contact, a "fax machine" contact, a "cafeteria" contact, a "human resources" contact, one or more co-worker contacts, or the like). For example, a "car" contact may be associated with, and configured to act as an interface to, a collection of more specialized contacts (e.g., an "engine" contact, "a climate control" contact, a "radio" contact, or the like). The associations between contacts of human entity $110_1$ may be used in various ways to support interactions between human entity $110_1$ and various other entities $110$.

The chat-based system $100$ may support a single login authentication capability for human entity $110_1$ via the chat application $112_1$, whereby human entity $110$ is only required to login chat application $112_1$ in order to access other entities $110$ associated with human entity $110_1$. For example, when human entity $110_1$ invokes the chat application $112_1$, human entity $110_1$ may be prompted to enter authentication information (e.g., login and password) which may then be sent to chat-based core $130$ for use in authenticating the human entity $110_1$ (namely, for determining whether human entity $110_1$ is permitted to access chat application $112_1$). Here, authentication of the human entity $110_1$ to access other entities $110$ may have been previously established, or may be performed by chat-based core $130$ on behalf of human entity $110_1$ responsive to authentication of human entity $110_1$ to access chat application $112_1$ (e.g., where chat-based core $130$ initiates authentication with one or more of the entities $110$ included in the contact list $113_1$ associated with human entity $110_1$). In either case, human entity $110_1$ is authenticated to access the other entities $110$ automatically, without requiring the human entity $110_1$ to enter additional authentication information for each of the other entities $110$. In other words, the authentication procedures of the chat application $112_1$ allow interaction with various devices (e.g., device entity $110_3$) and programs (e.g., program entity $110_4$). In this manner, authentication by the human entity $110_1$ for multiple other entities $110$ (e.g., devices, programs, or the like) becomes seamless for human entity $110_1$.

The chat application $112_1$ of user device $111_1$ is configured to provide various function supporting human-to-human interactions (e.g., between human entity $110_1$ and human entity $110_2$ via communication channel $140_1$) as well as other communication interaction types, including human-device interactions (e.g., between human entity $110_1$ and device entity $110_3$ via communication channel $140_2$) and human-program interactions (e.g., between human entity $110_1$ and program entity $110_4$ via communication channel $140_3$). The functions typically supported by a chat application in enabling human-to-human interactions are understood and thus, are not repeated herein. It will be appreciated that at least some such functions typically supported by a chat application in enabling human-to-human interactions may be used, or adapted for use, in supporting other communication interaction types discussed herein.

The chat application $112_1$ of user device $111_1$ may be configured to provide one or more mechanisms via which human entity $110_1$ may identify non-human entities 110 with which human entity $110_1$ has associations and, thus, with which the chat application $112_1$ has corresponding communication channels 140, respectively. For example, the chat application $112_1$ may be configured such that human entity $110_1$ may identify associated non-human entities 110 via one or more menus or other controls available from chat application $112_1$. For example, the chat application $112_1$ may be configured such that associated non-human entities 110 are represented within, and, thus, may be identified from, the contact list $113_1$ of the chat application $112_1$ (e.g., using an entity identifier of the non-human entity 110, similar to the manner in which human contacts (or "buddies") of human entity $110_1$ might be represented within contact list 113). The contact list $113_1$ may be a common contact list including both human entities 110 and non-human entities 110 with which human entity $110_1$ is associated (e.g., arranged alphabetically or based on status irrespective of whether the contact is a human entity 110 or a non-human entity 110, organized into subgroups based on the contacts being human entities 110 or non-human entities 110 and then arranged alphabetically or based on status, or the like), a separate contact list including only non-human entities 110 with which human entity $110_1$ is associated (e.g., where human entities 110 with which human entity $110_1$ is associated may be maintained in a separate contact list), or the like. In the case of dynamic addition or removal of non-human entities 110, the contact list $113_1$ may be automatically updated to display or not display non-human entities 110 as the non-human entities 110 are added or removed, respectively (in other words, non-human entities 110 may automatically appear on and disappear from contact list $113_1$ as the non-human entities 110 are added or removed, respectively). The chat application $112_1$ may be configured to provide other mechanisms via which human entity $110_1$ may identify non-human entities 110 with which human entity $110_1$ has associations.

The chat application $112_1$ of user device $111_1$ may be configured to provide one or more chat-based communication interfaces via which human entity $110_1$ may interact with non-human entities 110 with which human entity $110_1$ has associations. The manner in which human entity $110_1$ uses a chat-based communication interface of chat application $112_1$ to initiate communication with an associated non-human entity 110 may depend on the manner in which human entity $110_1$ identifies the associated non-human entity 110 via chat application $112_1$ (e.g., via one or more menu or other control selections, from displayed contact list 113, or the like). For example, human entity $110_1$ may select the associated non-human entity 110 from a drop-down menu, select the associated non-human entity 110 from contact list $113_1$ where the associated non-human entity 110 is displayed in the contact list 113, or the like. For example, selection of the associated non-human entity 110 may trigger opening of a window or dialog box via which the human entity 110 may initiate communications with the associated non-human entity 110 (e.g., typing text, attaching content or the like), may trigger opening of a menu via which the human entity 110 may initiate communications with the associated non-human entity 110, or the like, as well as various combinations thereof. The manner in which human entity $110_1$ is made aware of a communication from an associated non-human entity 110 via a chat-based communication interface of chat application $112_1$ may depend on the configuration of the chat application $112_1$. For example, notification of receipt of the communication from the associated non-human entity 110 may be presented to the human entity $110_1$ by the chat application $112_1$ via one or more interfaces of chat application $112_1$, by triggering opening of one or more windows outside of the context of chat application $112_1$, via invocation of one or more programs on user device $111_1$, or the like, as well as various combinations thereof. For example, notification of receipt of the communication from the associated non-human entity 110 may be presented to the human entity $110_1$ by the chat application $112_1$ via a presentation interface of user device $111_1$ (e.g., such that the human entity $110_1$ may then access the communication), the communication from the associated non-human entity 110 to the human entity $110_1$ may be presented to the human entity $110_1$ by the chat application $112_1$ (e.g., similar presentation of chat messages from human entities in typical chat applications), information provided from the associated non-human entity 110 to human entity $110_1$ may be presented to the human entity $110_1$ via invocation of one or more associated programs or applications on user device $111_1$ (e.g., launching a word processing application for presentation of a text document provided in the communication from the associated non-human entity 110, launching an audio player for playout of audio content provided in the communication from the associated non-human entity 110, launching a video player for playout of video content provided in the communication from the associated non-human entity 110, or the like), or the like, as well as various combinations thereof.

The chat applications $112_3$ and $112_4$ may be configured to operate in a manner similar to chat application $112_1$, although, as discussed above, it is expected that, rather than being displayed (such as chat applications $112_1$ and $112_2$), chat applications $112_3$ and $112_4$ may run on device entity $110_3$ and device $111_4$, respectively. The chat-based communication interfaces of chat applications $112_3$ and $112_4$ may include any suitable software and/or hardware based interfaces which enable interaction between the chat applications $112_3$ and $112_4$ and software and/or hardware components or elements of the device entity $110_3$ and the device $111_4$ on which chat applications $112_3$ and $112_4$ are executing, respectively, as discussed above.

The entity representatives 120 associated with entities 110 are configured to provide various functions, at least some of which have been discussed above. For example, an entity representative 120 associated with a non-human entity 110 may provide or support one or more of registration functions for enabling the non-human entity 110 to register with chat-based core 130 (and, thus, to be identified by and associated with human entity $110_1$), communication channel control functions for establishing and maintaining one or more communication channels 140 for chat-based communication between the non-human entity 110 and one or more other entities 110 (illustratively, communication channel $140_2$ for chat-based communication with human entity $110_1$, as well as any other suitable communication channels 140), communication control functions for controlling communication between the non-human entity 110 and one or more other entities 110 via one or more communication channels 140, translation functions for translating messages and information between the format(s) supported by the non-human entity 110 and the format(s) supported by one or more other entities 110 with which non-human entity 110 may communicate via one or more communication channels 140, enhanced processing functions for supporting enhanced processing which may be provided by the non-human entity 110 based on communication between the non-human entity 110 and one or more other entities 110 via one or more communication channels 140, or the like, as well as various combinations thereof. The translation functions may include natural language recognition capabilities for allowing chat-based communications to be translated between human-understandable text and formats supported by non-human entities 110. Similarly, for example, an entity representative 120 associated with a human entity 110 (illustratively, entity representative $120_1$ associated with human entity $110_1$) may be configured to provide similar functions for supporting communications between the human entity 110 and one or more non-human entities 110. The entity representatives 120 may be configured to support various types of activities and services which may be provided based on communication between entities 110 via communication channels 140. The entity representatives 120 also may be configured to include various modules or provide various functions primarily depicted and described herein as being performed by chat applications 112 operating on endpoint devices (e.g., providing a differently or more distributed deployment of chat applications 112).

The chat-based core 130 is configured to provide various functions, at least some of which have been discussed above. For example, chat-based core 130 may provide or support one or more of registration functions for enabling the entities 110 to register with chat-based core 130 (and, thus, to be identified by and associated with other entities 110), communication channel control functions for establishing and maintaining communication channels 140 between chat applications 112 of entities 110, communication control functions for controlling communication between entities 110 via associated communication channels 140, translation functions for translating messages and information between different formats supported by different entities 110, enhanced processing functions for supporting enhanced processing which may be provided based on communication between entities 110 via communication channels 140, or the like, as well as various combinations thereof. The translation functions may include natural language recognition capabilities for allowing chat communications to be translated between human-understandable text and formats supported by non-human entities 110. The chat-based core 130 may be configured to support various types of activities and services which may be provided based on communication between entities 110 via communication channels 140. The chat-based core 130 also may be configured to include various modules or provide various functions primarily depicted and described herein as being performed by chat applications 112 operating on endpoint devices (e.g., providing a differently or more distributed deployment of chat applications 112).

The communication channels 140 established between chat application $112_1$ of human entity $110_1$ and chat applications 112 of other entities 110 support chat-based communications between human entity $110_1$ and the other entities 110, respectively. The communication channels 140 may be established and maintained using chat-based functions. The communication channels 140 may be accessed via chat-based communication interfaces supported by the chat applications 112 between which the communication channels 140 are established. The communication channels 140 support various communication interaction types as discussed above. The communication channels 140 support chat-based or chat-like communication between human entity $110_1$ and other entities 110. The communication channels 140 provide communication paths for various types of messages and information which may be exchanged between entities 110 (e.g., requests and responses, commands and responses, event notifications, content delivery, or the like, as well as any other types of messages or information which may be propagated via the communication channels 140). The communication channels 140 may support various types of activities and services which may be provided based on communication between human entity $110_1$ and other entities 110 via communication channels 140. The communication channels 140 may be supported using any suitable underlying communication networks (e.g., wireline networks, wireless networks, or the like) which, it will be appreciated, may depend on the context within which the communication channels 140 are established. As indicated above, although the communication channels 140 are primarily depicted and described as being established between the chat application $112_1$ of user device $111_1$ of human entity $110_1$ and the chat applications 112 of other entities 110, the communication channels 140 also may be considered to be established between the user device $111_1$ of human entity $110_1$ and devices hosting the chat applications 112 of the other entities 110, between the user device $111_1$ of human entity $110_1$ and programs associated with the chat applications 112 of the other entities 110, or the like.

The chat-based system 100 may be configured to support enhanced processing for communications exchanged via communication channels 140. As noted above, enhanced processing for communications exchanged via communication channel 140 may be provided by one or more of the entities 110 participating in the communication, one or more entity representatives 120 of the one or more of the entities 110 participating in the communication, chat-based core 130, or a combination thereof. For example, enhanced processing for communications exchanged via a given communication channel 140 may include time-based acceleration or deceleration of actions based on context (e.g., delaying printing of a document by a printer until the person is detected as being at or near the location of the printer, accelerating processing of a food order at a restaurant based on a determination that the person has arrived at the restaurant ahead of schedule, or the like), initiating or terminating one or more entity associations (e.g., adding a new entity to a contact list or removing an entity from a contact list) based on information exchanged via the given communication channel 140 (e.g., automatically initiating addition of a home security control entity for securing a home of a user based on a chat message indicative that the user is away from home, automatically initiating removal of a printer entity for a work printer of a user based on a chat message indicative that the user is working from home, or the like), initiating one or more messages to one or more existing or new entities via one or more existing or new communication channels based on information exchanged via the given communication channel 140 (e.g., automatically initiating a message to a taxi scheduling entity for scheduling a taxi based on detection that a concierge entity has made a reservation with a restaurant entity, automatically initiating a message to a credit score entity based on detection that a banking entity requires credit scope information, or the like), automatically performing one or more actions outside of the context of the chat application based on context information determined from communications exchanged via the given communication channel 140 (e.g., initiating or terminating a phone call, launching or terminating a program, or the like), or the like, as well as various combinations thereof.

The chat-based system 100 may be configured to support higher level system enhancements for chat-based system 100. For example, chat-based system 100 may be configured to generate various contexts for various chat sessions and to use the context information to control execution of chat-based system 100 (e.g., context information about past interactions among chat participants via chat-based system 100 can be used by chat-based system 100 to fine-tune various aspects of chat-based system 100, such as the form of interaction between chat participants, presentation of data to chat participants, or the like, as well as various combinations thereof).

The chat-based system 100 may be configured to support data analytics functions. In at least some embodiments, data from one or more entities 110 may be analyzed to develop a model or representation of the context in which a chat(s) occurs. The data may include chat messages, data other than chat-based data, or a combination thereof. The data analytics may be performed locally (e.g., using one or more local modules), remotely (e.g., using one or more remote modules), or a combination thereof. The context may then be utilized locally (e.g., by one or more local modules), remotely (e.g., by one or more remote modules), or a combination thereof. The context may be used for various purposes (e.g., to handle chat messages, to act in response to chat messages, or the like, as well as various combinations thereof). The data analytics functions may be provided by chat-based core 130, entity representatives 120, entities 110, or the like, as well as various combinations thereof. The use of context in this manner permits integration of data analytics into a wide range of communication functions and behaviors.

As discussed above, while chat-based system 100 is primarily depicted and described with respect to supporting multiple communication interaction types for a human entity, chat-based system 100 may be configured to support communication between non-human entities, where the non-human entities may include devices, programs, processes, organizations, or the like. An example is depicted in FIG. 1, where a communication channel 141 is established between chat application 112$_3$ of device entity 110$_3$ and chat application 112$_4$ of program entity 110$_4$. The establishment and use of communication channel 141 may be similar to establishment and use of communication channels 140. For example, where device entity 110$_3$ is a printer located in an office of an employee of a company and program entity 110$_4$ is a human resources program of the company, the human resources program may propagate a benefits agreement that needs to be signed by the employee to the printer, via the communication channel 141, such that the benefits agreement is automatically printed and readily available for signature by the employee. For example, where device entity 110$_3$ is a security camera and program entity 110$_4$ is a security monitoring program, the security monitoring program may propagate a reconfiguration message to the security camera, via the communication channel 141, such that the security camera is automatically reconfigured based on the needs of the security program. For example, where device entity 110$_3$ is a content server and program entity 110$_4$ is a personal content scheduling program of a user that is running on a device (e.g., computer, digital video recorder, or the like), the personal content scheduling program may propagate a content request message to the content server via the communication channel 141 in order to request retrieval of a content item predicted by the personal content scheduling program to be of interest to the user, and the content server may provide the requested content item to the personal content scheduling program for storage on the device on which the personal content scheduling program is running. It will be appreciated that, although primarily depicted and described with respect to a specific communication interaction type between specific types of non-human entities (namely, device-program communications), chat-based system 100 may be configured to support various other communication interaction types between various other combinations of non-human entities (e.g., device-device communications between devices, program-program communications between programs, device-process communications between a device and a process, program-process communications between a program and a process, process-process communications, and so forth). For example, a power monitoring entity could use a chat-based communication channel to ask a power meter for a current reading. For example, a concierge entity could use a chat-based communication channel to ask a restaurant entity for a reservation. It will be appreciated that the foregoing examples are merely a few of the ways in which chat-based communication between multiple non-human entities may be used.

It will be appreciated that, although omitted from FIG. 1 for purposes of clarity, each chat application 112 may be implemented using any suitable concentration or distribution of functions. For example, chat applications 112 depicted in FIG. 1 may simply be chat application clients and other modules or functions of the associated chat application may be implemented in other locations (e.g., on entity representatives 120, on chat-based core 130). Various other arrangements of the functions of chat applications 112 within chat-based system 100 are contemplated.

It will be appreciated that, although omitted from FIG. 1 for purposes of clarity, each entity representative 120 may be implemented using any suitable concentration or distribution of functions (e.g., providing the functions of an entity representative 120 on one or more devices associated with the entity representative 120, providing the functions of an entity representative 120 on one or more network devices, distributing the functions of an entity representative 120 across one or more devices associated with the entity representative 120 and one or more network devices, or the like, as well as various combinations thereof).

It will be appreciated that, although omitted from FIG. 1 for purposes of clarity, chat-based core 130 may be implemented in any suitable manner (e.g., on one or more dedicated servers, using one or more sets of virtual resources hosted within one or more networks or datacenters, or the like, as well as various combinations thereof).

It will be appreciated that, although primarily depicted and described with respect to embodiments in which chat application 112$_1$ is configured to support human-to-human communication as well as other communication interaction types, in at least some embodiments the chat application 112$_1$ may be configured only for interaction between human entity 110$_1$ and non-human entities 110. In other words, the chat application 112$_1$ may be dedicated for supporting various communication interaction types involving communication between human entity 110$_1$ and non-human entities 110, thereby providing one or more of a device access and use capability, a program access and use capability, or the like, as well as various combinations thereof.

Figure 2:
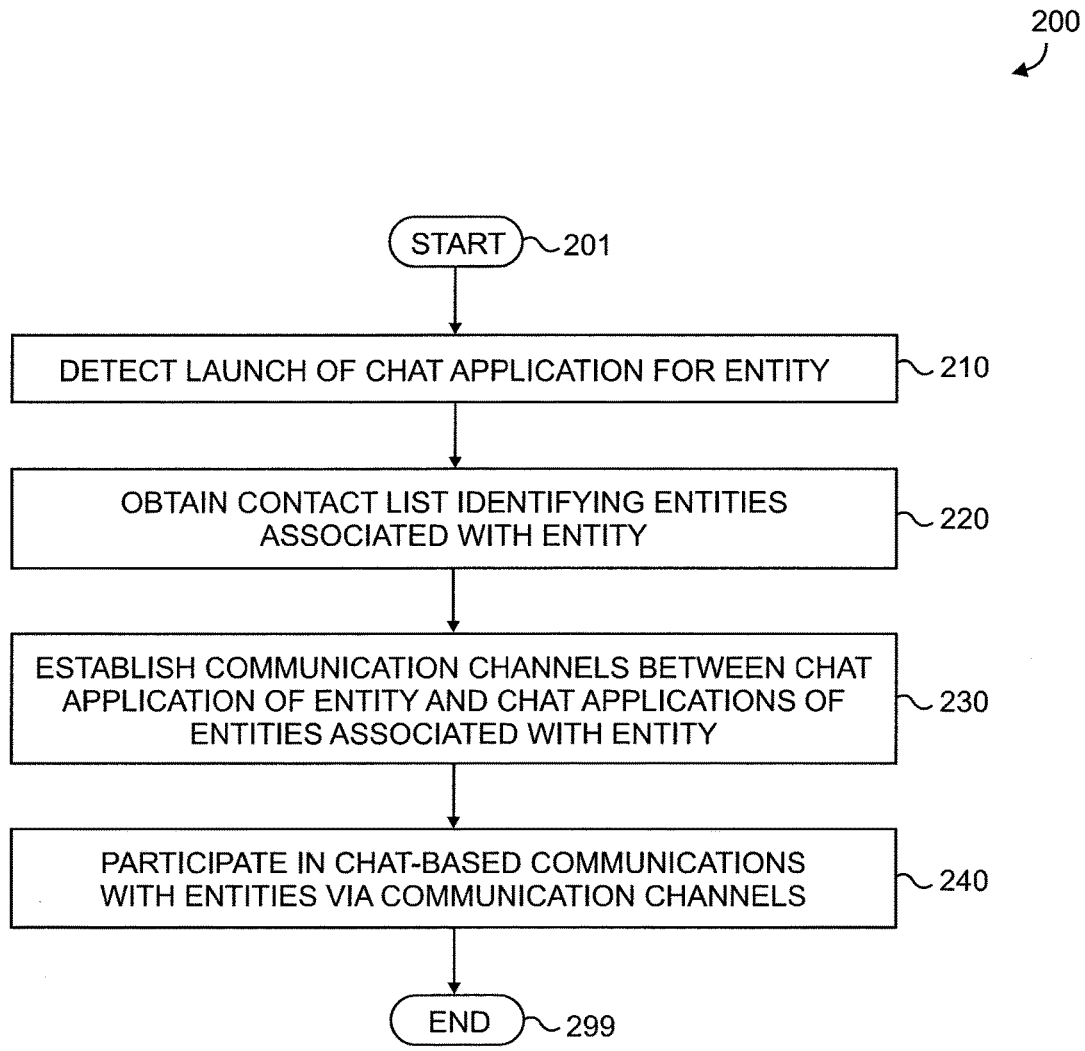
FIG. 2 depicts an exemplary embodiment of a method for supporting chat-based communications for multiple communication interaction types.

FIG. 2 depicts an exemplary embodiment of a method for supporting chat-based communications for multiple communication interaction types. It will be appreciated that, although primarily depicted and described from the perspective of an entity (or a device supporting communications by the entity), the execution of at least a portion of the steps of method 200 also may include various actions which may be performed by other elements (e.g., other entities, entity representatives of the entities, a chat-based core, or the like, as well as various combinations thereof). It will be appreciated that, although primarily depicted and described as being performed serially, at least a portion of the steps of method 200 may be performed contemporaneously or in a different order than as presented in FIG. 2. At step 201, method 200 begins. At step 210, the launch of a chat application for an entity is detected. The entity may be a human entity or a non-human entity. At step 220, a contact list, identifying entities associated with the entity, is obtained. The entities may include one or more human entities, one or more non-human entities, or combinations thereof. At step 230, communication channels are established between the chat application of the entity and chat applications of the entities identified in the contact list. At step 240, the entity participates in chat-based communications with entities identified in the contact list via the communication channels established between the chat application of the entity and the chat applications of the entities identified in the contact list. At step 299, method 200 ends. It will be appreciated that various functions depicted and described within the context of FIG. 1 may be provided within the context of method 200 of FIG. 2.

Figure 3:
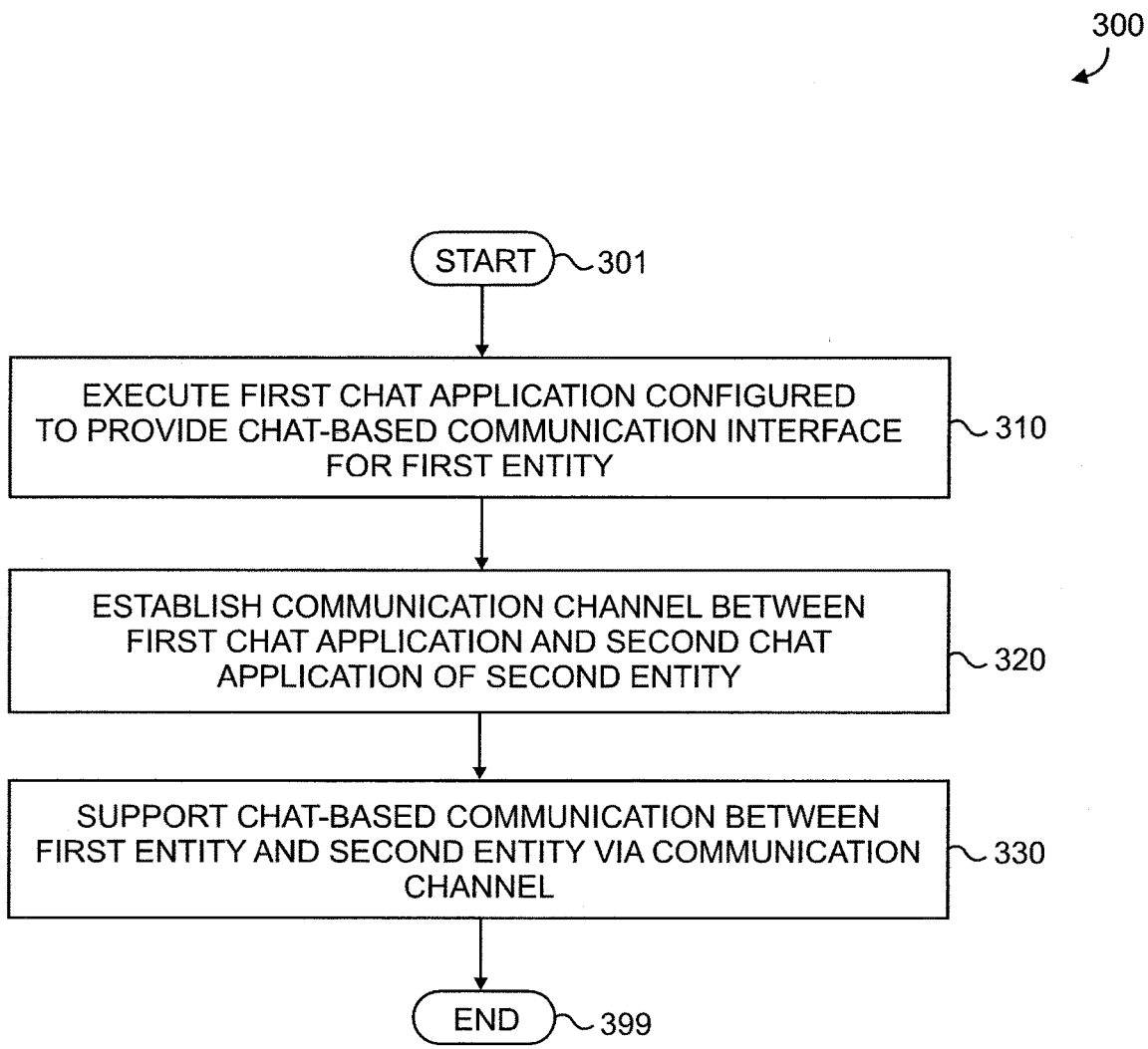
FIG. 3 depicts an exemplary embodiment of a method for supporting chat-based communications.

FIG. 3 depicts an exemplary embodiment of a method for supporting chat-based communications. It will be appreciated that, although primarily depicted and described from the perspective of an entity (or a device supporting communications by the entity), the execution of at least a portion of the steps of method 300 also may include various actions which may be performed by other elements (e.g., other entities, entity representatives of the entities, a chat-based core, or the like, as well as various combinations thereof). It will be appreciated that, although primarily depicted and described as being performed serially, at least a portion of the steps of method 300 may be performed contemporaneously or in a different order than as presented in FIG. 3. At step 301, method 300 begins. At step 310, a first chat application configured to provide a chat-based communication interface for a first entity is executed. The first chat application configured to provide the chat-based communication interface for the first entity also may be said to be invoked, or may be said to running or active. At step 320, a communication channel is established between the first chat application and a second chat application of a second entity. The second entity is a non-human entity. At step 330, chat-based communication between the first entity and the second entity is supported via the communication channel. At step 399, method 300 ends. The communication channel may be established based on a determination that the second entity is associated with the first chat application. The determination that the second entity is associated with the first chat application may be based on a determination that the second entity is included within a contact list of the first chat application. The determination that the second entity is associated with the first chat application may be performed responsive to invocation of the first chat application. The determination that the second entity is associated with the first chat application may be a dynamic detection of association of the second entity with the first chat application while the first chat application is running. The dynamic association of the second entity with the first chat application while the first chat application is running may be performed based on at least one of context information associated with the first entity or context information associated with the second entity. The context information associated with the first entity may include at least one of a location of the first entity, information from a chat-based communication of the first entity, a detected need of the first entity, or the like. The context information associated with the second entity may include at least one of a location of the second entity, a capability of the second entity, or the like. The support of chat-based communication between the first entity and the second entity via the communication channel may include propagating, toward the second chat application of the second entity via the communication channel, information entered by the first entity via the chat-based communication interface of the first chat application. The support of chat-based communication between the first entity and the second entity via the communication channel may include receiving information entered by the first entity via the chat-based communication interface of the first chat application, processing the information to convert the information into modified information (e.g., translating the information from one format to another, supplementing the information with additional information, or the like, as well as various combinations thereof), and propagating the modified information toward the second entity via the communication channel. The support of chat-based communication between the first entity and the second entity via the communication channel may include receiving information from the second entity via the communication channel and initiating propagation or presentation of the information to the first entity. The initiation of presentation of the information to the first entity may include at least one of initiating presentation of at least a portion of the information via the chat-based communication interface of the first chat application, initiating presentation of at least a portion of the information via an interface other than the chat-based communication interface of the first chat application, or the like. The support of chat-based communication between the first entity and the second entity via the communication channel may include receiving information from the second entity via the communication channel, processing the information to convert the information into modified information (e.g., translating the information from one format to another, supplementing the information with additional information, or the like, as well as various combinations thereof), and propagating the modified information toward the first entity. The communication channel may be terminated based on a determination that the second entity is no longer associated with the first chat application. The first entity may be a human entity or a non-human entity. The non-human entity may be a device, a program, or another non-human entity. The non-human entity may include a process or an organization, where the communication channel is established with a device or program associated with the process or the organization. It will be appreciated that various functions depicted and described within the context of FIG. 1 may be provided within the context of method 300 of FIG. 3.

Figure 4:
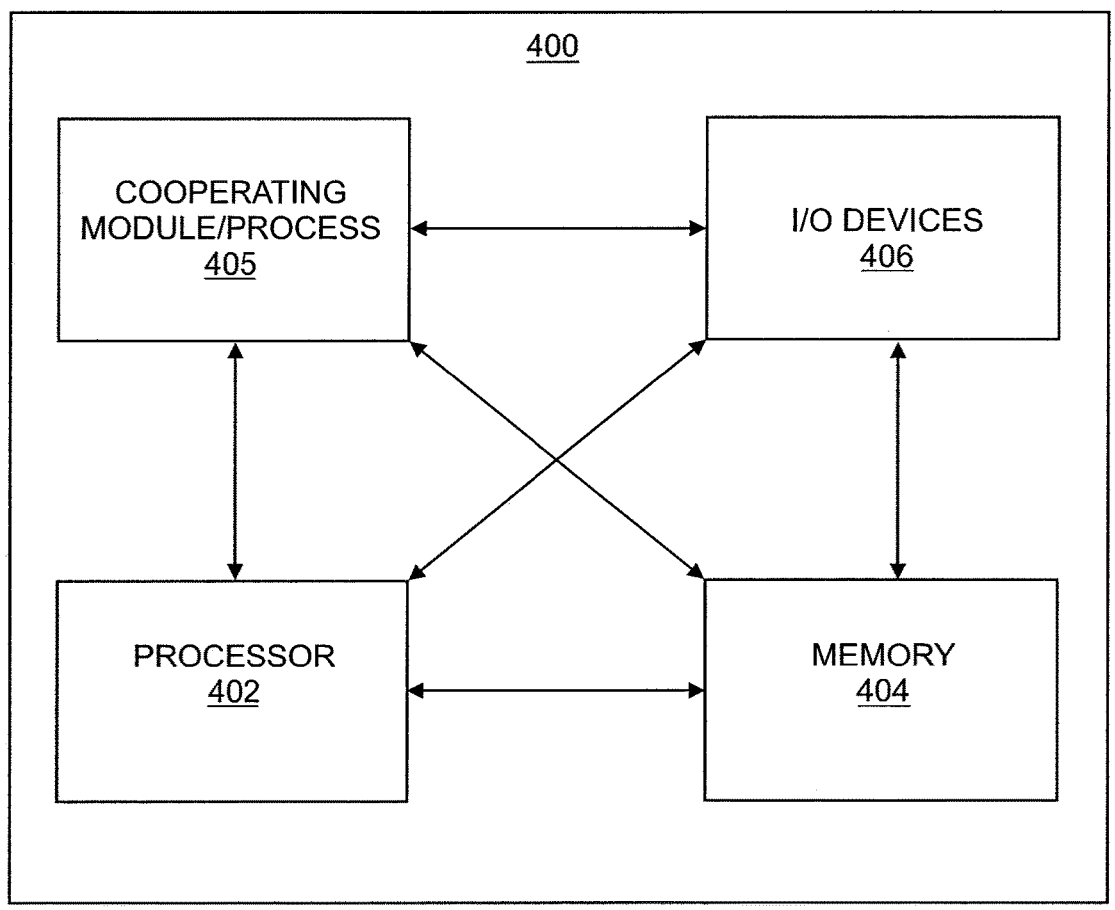
FIG. 4 depicts a high-level block diagram of a computer suitable for use in performing functions presented herein.

FIG. 4 depicts a high-level block diagram of a computer suitable for use in performing functions described herein.

The computer 400 includes a processor 402 (e.g., a central processing unit (CPU) and/or other suitable processor(s))

and a memory 404 (e.g., random access memory (RAM), read only memory (ROM), and the like).

The computer 400 also may include a cooperating module/process 405. The cooperating process 405 can be loaded into memory 404 and executed by the processor 402 to implement functions as discussed herein and, thus, cooperating process 405 (including associated data structures) can be stored on a computer readable storage medium, e.g., RAM memory, magnetic or optical drive or diskette, and the like.

The computer 400 also may include one or more input/output devices 406 (e.g., a user input device (such as a keyboard, a keypad, a mouse, and the like), a user output device (such as a display, a speaker, and the like), an input port, an output port, a receiver, a transmitter, one or more storage devices (e.g., a tape drive, a floppy drive, a hard disk drive, a compact disk drive, and the like), or the like, as well as various combinations thereof).

It will be appreciated that computer 400 depicted in FIG. 4 provides a general architecture and functionality suitable for implementing functional elements described herein and/or portions of functional elements described herein. For example, computer 400 provides a general architecture and functionality suitable for implementing one or more of user device 111$_1$, user device 111$_2$, one or more entity representatives 120, chat-based core 130, one or more elements of chat-based core 130, or the like.

It will be appreciated that the functions depicted and described herein may be implemented in software (e.g., via implementation of software on one or more processors, for executing on a general purpose computer (e.g., via execution by one or more processors) so as to implement a special purpose computer, and the like) and/or may be implemented in hardware (e.g., using a general purpose computer, one or more application specific integrated circuits (ASIC), and/or any other hardware equivalents).

It will be appreciated that some of the steps discussed herein as software methods may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in fixed or removable media, transmitted via a data stream in a broadcast or other signal bearing medium, and/or stored within a memory within a computing device operating according to the instructions.

It will be appreciated that the term "or" as used herein refers to a non-exclusive "or," unless otherwise indicated (e.g., use of "or else" or "or in the alternative").

It will be appreciated that, although various embodiments which incorporate the teachings presented herein have been shown and described in detail herein, those skilled in the art can readily devise many other varied embodiments that still incorporate these teachings.

What is claimed is:

1. An apparatus, comprising:
a processor and a memory communicatively connected to the processor, the processor configured to:
provide a first chat application configured to provide a chat-based communication interface for a first entity and a second chat application configured to provide a chat-based communication interface for a second entity;
support a chat-based communication between the first entity and the second entity;
identify, based on context information associated with the first entity, a third entity not currently associated with the first chat application, wherein the third entity comprises a device, wherein the context information comprises an indication of a proximity of the first entity to the device and information from the chat-based communication between the first entity and the second entity;
associate the third entity with the first chat application;
establish a communication channel between the first chat application and a third chat application configured to provide a chat-based communication interface for the third entity; and
support chat-based communication between the first entity and the third entity via the communication channel.

2. The apparatus of claim 1, wherein the context information associated with the first entity further comprises a location of the first entity.

3. The apparatus of claim 1, wherein the first entity and the second entity are human entities.

4. The apparatus of claim 3, wherein the second entity comprises a program or a device.

5. The apparatus of claim 1, wherein the first entity is a human entity and the second entity is a non-human entity.

6. The apparatus of claim 1, wherein the context information associated with the first entity further comprises an inferred or detected need of the first entity.

7. The apparatus of claim 1, wherein the processor is configured to identify the third entity based on context information associated with the third entity.

8. The apparatus of claim 7, wherein the context information associated with the third entity comprises at least one of a location of the third entity or a capability of the third entity.

9. The apparatus of claim 1, wherein, to support chat-based communication between the first entity and the third entity via the communication channel, the processor is configured to:
receive, via the communication channel, information entered by the first entity via the chat-based communication interface of the first chat application; and
propagate, toward the third chat application of the third entity via the communication channel, information entered by the first entity via the chat-based communication interface of the first chat application.

10. The apparatus of claim 1, wherein, to support chat-based communication between the first entity and the third entity via the communication channel, the processor is configured to:
receive, via the communication channel, information entered by the first entity via the chat-based communication interface of the first chat application;
process the information to convert the information into modified information; and
propagate, toward the third chat application of the third entity via the communication channel, the modified information.

11. The apparatus of claim 1, wherein, to support chat-based communication between the first entity and the third entity via the communication channel, the processor is configured to:
receive, via the communication channel, information from the third entity; and propagate, toward the first chat application of the first entity via the communication channel, the information from the third entity.

12. The apparatus of claim 1, wherein, to support chat-based communication between the first entity and the third entity via the communication channel, the processor is configured to:
receive, via the communication channel, information from the third entity;
process the information to convert the information into modified information; and
propagate, toward the first chat application of the first entity via the communication channel, the modified information.

13. The apparatus of claim 1, wherein the processor is configured to:
terminate the communication channel based on a determination that the third entity is no longer associated with the first chat application of the first entity.

14. The apparatus of claim 1, wherein the first entity is a human entity.

15. The apparatus of claim 1, wherein the first entity is a non-human entity.

16. The apparatus of claim 15, wherein the non-human entity comprises a program or a device.

17. The apparatus of claim 1, wherein the processor is configured to establish the communication channel automatically based on detection of a trigger condition.

18. The apparatus of claim 17, wherein the trigger condition comprises at least one of invocation of the first chat application, a determination that the third entity is associated with the first chat application, or a determination that the third entity is included within a contact list of the first chat application.

19. A method, comprising:
providing, by a processor, a first chat application configured to provide a chat-based communication interface for a first entity and a second chat application configured to provide a chat-based communication interface for a second entity;
supporting, by the processor, a chat-based communication between the first entity and the second entity;
identifying, by the processor based on context information associated with the first entity, a third entity not currently associated with the first chat application, wherein the third entity comprises a device, wherein the context information comprises an indication of a proximity of the first entity to the device and information from the chat-based communication between the first entity and the second entity;
associating, by the processor, the third entity with the first chat application;
establishing, by the processor, a communication channel between the first chat application and a third chat application configured to provide a chat-based communication interface for the third entity; and
supporting, by the processor, chat-based communication between the first entity and the third entity via the communication channel.

20. A non-transitory computer-readable storage medium storing instructions which, when executed by a computer, cause the computer to perform a method, the method comprising:
providing a first chat application configured to provide a chat-based communication interface for a first entity and a second chat application configured to provide a chat-based communication interface for a second entity;
supporting a chat-based communication between the first entity and the second entity;
identifying, based on context information associated with the first entity, a third entity not currently associated with the first chat application, wherein the third entity comprises a device, wherein the context information comprises an indication of a proximity of the first entity to the device and information from the chat-based communication between the first entity and the second entity;
associating the third entity with the first chat application;
establishing a communication channel between the first chat application and a third chat application configured to provide a chat-based communication interface for the third entity; and
supporting chat-based communication between the first entity and the third entity via the communication channel.

21. An apparatus, comprising:
a processor and a memory communicatively connected to the processor, the processor configured to:
facilitate chat-based communication between a first entity and a second entity via a communication channel between a first chat application configured to provide a chat-based communication interface for the first entity and a second chat application configured to provide a chat-based communication interface for the second entity, wherein the second entity comprises a non-human entity;
detect, based on information exchanged via the chat-based communication, a request by the first entity for the second entity to perform an action;
determine context information associated with the first entity, wherein the context information associated with the first entity comprises an indication of a proximity of the first entity to the second entity; and
initiate time-based acceleration or deceleration of the action based on the indication of the proximity of the first entity to the second entity.

22. The apparatus of claim 21, wherein the processor is configured to:
initiate establishment of the communication channel based on detection of a trigger condition.

23. The apparatus of claim 21, wherein the processor is configured to:
perform additional processing based on additional information exchanged via the chat-based communication.

24. The apparatus of claim 23, wherein, to perform additional processing based on the additional information exchanged via the chat-based communication, the processor is configured to:
convert at least a portion of the additional information exchanged via the chat-based communication between a first format supported by the first entity and a second format supported by the second entity.

25. The apparatus of claim 23, wherein, to perform additional processing based on the additional information exchanged via the chat-based communication, the processor is configured to:
initiate at least one of establishment of a new communication channel configured to support chat-based communication or termination of an existing communication channel configured to support chat-based communication.

26. The apparatus of claim 23, wherein, to perform additional processing based on the additional information exchanged via the chat-based communication, the processor is configured to:
  initiate at least one of establishment of a new entity association or termination of an existing entity association.

27. The apparatus of claim 21, wherein the context information associated with the first entity further comprises a location of the first entity.

28. The apparatus of claim 21, wherein the processor is configured to:
  determine context information associated with the second entity; and
  initiate the time-based acceleration or deceleration of the action based on the context information associated with the second entity.

29. The apparatus of claim 28, wherein the context information associated with the second entity comprises a location of the second entity.

30. The apparatus of claim 21, wherein the processor is configured to:
  develop a representation of a context of the chat-based communication; and
  initiate use of the representation of the context of the chat-based communication to facilitate at least one additional chat-based communication.

31. The apparatus of claim 21, wherein the first entity is a human entity.

* * * * *